(12) United States Patent
Alive et al.

(10) Patent No.: US 8,318,629 B2
(45) Date of Patent: Nov. 27, 2012

(54) PLATINUM GROUP METAL-FREE CATALYSTS FOR REDUCING THE IGNITION TEMPERATURE OF PARTICULATES ON A DIESEL PARTICULATE FILTER

(75) Inventors: Keshavaraja Alive, South Plainfield, NJ (US); Anne-Laure Baudoux, Champagne au Mont d'Or (FR); Stephen J. Golden, Santa Barbara, CA (US); Svetlana Iretskaya, Ventura, CA (US)

(73) Assignees: Catalytic Solutions, Inc., Ventura, CA (US); ECS Holdings, Inc., Ventura, CA (US)

( * ) Notice: Subject to any disclaimer, the term of this patent is extended or adjusted under 35 U.S.C. 154(b) by 0 days.

(21) Appl. No.: 11/251,372

(22) Filed: Oct. 14, 2005

(65) Prior Publication Data

US 2006/0120936 A1    Jun. 8, 2006

Related U.S. Application Data

(60) Provisional application No. 60/619,382, filed on Oct. 14, 2004, provisional application No. 60/619,390, filed on Oct. 14, 2004, provisional application No. 60/619,314, filed on Oct. 14, 2004.

(51) Int. Cl.
*B01J 23/00* (2006.01)
*B01J 21/00* (2006.01)
*B01J 29/00* (2006.01)
*B01J 37/00* (2006.01)

(52) U.S. Cl. ........ 502/304; 502/302; 502/303; 502/324; 502/325; 502/326; 502/327; 502/328; 502/332; 502/340; 502/341; 502/345; 502/346; 502/355; 502/415; 502/439; 502/527.12; 502/527.13

(58) Field of Classification Search .................. 502/302, 502/303, 304, 324, 325–328, 332, 340, 341, 502/345, 346, 355, 415, 439, 527.12, 527.13
See application file for complete search history.

(56) References Cited

U.S. PATENT DOCUMENTS 3,752,774 A * 8/1973 Stiles ............................. 502/304
3,897,367 A   7/1975 Lauder ......................... 252/462
(Continued)

FOREIGN PATENT DOCUMENTS
EP         0 532 024 A1      9/1992
(Continued)

*Primary Examiner* — Cam N. Nguyen
(74) *Attorney, Agent, or Firm* — Thaddius J. Carvis

(57) ABSTRACT

A catalyzed diesel particulate filter (CDPF) and a method for filtering particulates from diesel engine exhaust are provided, where the catalyzed diesel particulate filter includes a substrate and a catalyst composition, where the catalyst composition contains at least one first component, at least one second component, and at least one third component, where the first component is at least one first component selected from the group consisting of cerium and a lanthanide and mixtures thereof, the at least one second component is selected from the group consisting of cobalt, copper, manganese and mixtures thereof; and the third component comprises strontium, where the first component, the second component, and the third component are in an oxide form after calcination. The catalyst on the catalyzed diesel particulate filter lowers the temperature at which particulates are removed from the CDPF by oxidizing the particulates on the filter. The catalyzed diesel particulate filter may also include a washcoat. Washcoats prepared from colloidal aluminum oxide may have higher surface areas and pore volumes loadings than washcoats containing aluminum oxide prepared from aluminum nitrate.

18 Claims, 6 Drawing Sheets

U.S. PATENT DOCUMENTS

| | | | | |
|---|---|---|---|---|
| 4,151,123 | A | | 4/1979 | McCann, III ................. 252/462 |
| 4,162,235 | A | * | 7/1979 | Acres et al. ................... 502/243 |
| 4,237,032 | A | * | 12/1980 | Evans et al. ................... 502/303 |
| 4,485,191 | A | * | 11/1984 | Sekido et al. ................. 502/303 |
| 5,502,019 | A | * | 3/1996 | Augustine et al. ............ 502/314 |
| 5,622,680 | A | * | 4/1997 | Monceaux et al. ........ 423/213.5 |
| 5,948,723 | A | * | 9/1999 | Sung ............................ 502/303 |
| 5,977,017 | A | | 11/1999 | Golden ......................... 502/525 |
| 5,993,764 | A | * | 11/1999 | Tabata et al. ............... 423/239.2 |
| 6,060,420 | A | | 5/2000 | Munakata et al. ............ 502/302 |
| 6,110,860 | A | | 8/2000 | Inoue et al. ................... 502/218 |
| 6,245,306 | B1 | | 6/2001 | Miyazaki et al. .......... 423/215.5 |
| 6,328,779 | B1 | * | 12/2001 | He et al. .......................... 55/523 |
| 6,352,955 | B1 | | 3/2002 | Golden ......................... 502/302 |
| 6,372,686 | B1 | * | 4/2002 | Golden ......................... 502/302 |
| 6,458,741 | B1 | * | 10/2002 | Roark et al. .................. 502/303 |
| 6,531,425 | B2 | * | 3/2003 | Golden ......................... 502/302 |
| 6,881,703 | B2 | * | 4/2005 | Cutler et al. .................. 502/439 |
| 7,014,825 | B2 | * | 3/2006 | Golden ...................... 423/213.2 |
| 7,235,507 | B2 | * | 6/2007 | Xu et al. .......................... 502/63 |
| 7,329,627 | B2 | * | 2/2008 | Wanninger et al. ........... 502/304 |
| 7,740,817 | B2 | * | 6/2010 | Matsumoto et al. ....... 423/213.2 |
| 2002/0042341 | A1 | * | 4/2002 | Golden ......................... 502/303 |
| 2003/0198579 | A1 | * | 10/2003 | LaBarge ....................... 422/179 |
| 2003/0198582 | A1 | | 10/2003 | Golden ...................... 423/213.2 |
| 2006/0081922 | A1 | * | 4/2006 | Golden ......................... 257/335 |

FOREIGN PATENT DOCUMENTS

EP            0 658 369 A2    12/1994

* cited by examiner

PLATINUM GROUP METAL-FREE CATALYSTS FOR REDUCING THE IGNITION TEMPERATURE OF PARTICULATES ON A DIESEL PARTICULATE FILTER

RELATED APPLICATIONS

This application claims the benefit under 35 U.S.C. §119 (e) of U.S. Provisional Application Nos.: 60/619,382; 60/619,390; and 60/619,314, all filed on Oct. 14, 2004, all of which are incorporated herein by reference in their entirety.

FIELD OF THE INVENTION

Embodiments of the present invention relate to platinum group metal (PGM)-free catalyst compositions for reducing the ignition temperature of particulates on a diesel particulate filter.

BACKGROUND

Diesel engines for motor vehicles have good fuel economy and high durability. Unfortunately, the exhaust gas from diesel engines contains high levels of $NO_x$ and particulates. Both the United States and Europe have enacted regulations with strict limits on $NO_x$ and particulate emissions from diesel engines. The particulate and $NO_x$ limits as of 2004 for US trucks are 0.1 g/bhp-hr and 2 g/bhp-hr, respectively. The limits decrease to 0.01 g/bhp-hr and 0.2 g/bhp-hr in 2007.

Diesel particulate filters (DPFs) have been installed on buses and diesel automobiles for many years to remove the particulates from the exhaust stream. The filters may become plugged due to the buildup of particulates on the filter. The pressure drop through the filter may increase as the particulate levels on the filter increase. The plugged filter may have to be regenerated or replaced.

The particulates may comprise a mixture of lube oil solids, carbon particulates, and inorganic ash. The lube oil solids and carbon particulates can sometimes be removed from the DPF through combustion. The ignition temperature of the carbon particulates is normally about 600° C. Diesel exhaust temperatures are rarely that high. The exhaust gas temperature can be increased by retarding the timing but at the cost of fuel efficiency. Alternatively, the filter can be heated with an electric heater. Heating the electric heater requires energy, with an accompanying fuel efficiency penalty.

Johnson Matthey has described a system called "Continuously Regenerating Trap" ("CRT™"). A platinum-based diesel oxidation catalyst (DOC) is placed upstream of the DPF to oxidize NO in the exhaust stream to $NO_2$. The $NO_2$ in the exhaust stream may oxidize the carbon particles and lube oil solids on the DPF at lower temperatures than does the oxygen in the diesel exhaust gas. The CRT™ system is described, for example, in U.S. Pat. No. 4,902,487 to Cooper et al.

The platinum in the CRT™ DOC is expensive. Further, platinum catalysts may be poisoned by sulfur in the diesel fuel. Low sulfur diesel fuel is costly.

Catalysts have been dissolved or suspended in diesel fuel to lower the combustion temperature of the carbon particulates on the DPF. Use of fuel-borne catalysts requires additional components such as a tank for the fuel additive, a dosing system, and infrastructure to fill the additive tank. The fuel-borne additive can be expensive, particularly if the fuel-borne additive is a platinum group metal (PGM). Further, the fuel-borne additive can form particulate particles that may accumulate on the DPF, making it necessary to change the DPF.

Placing a catalyst on the DPF to lower the ignition temperature of the particles may be an attractive alternative to a fuel-borne catalyst. Hartwig (U.S. Pat. No. 4,510,265) describes a catalyst comprising a platinum group metal and silver vanadate. The catalyst of Homeier (U.S. Pat. No. 4,759,918) comprises platinum, palladium, or rhodium on a sulfur resistant support such as titania or zirconia. Dettling (U.S. Pat. No. 5,100,632) utilizes a catalyst that is a mixture of one or more platinum group metals and one or more alkaline earth oxides such as magnesium oxide. The catalysts of Harwig, Homeier, and Dettling al. comprise platinum group metals (PGMs). Platinum group metal (PGM) catalysts are expensive.

DPF's that contain vanadium catalysts to lower the combustion temperature of the carbon particulates have been described in U.S. Pat. No. 4,900,517 to DeGussa A. G. Other vanadium catalysts are discussed in U.S. Pat. No. 6,013,599, assigned to Redem.

Vanadium oxides are volatile and toxic. The high temperatures that are present in the DPF during combustion of the carbon particulates can vaporize the vanadium catalysts on the DPF, potentially leading to health problems in the general populace. There is a need for DPF catalysts that do not contain expensive PGMs or toxic vanadium compounds.

The surface area of many DPF catalysts is low. Adding a washcoat to the DPF to support the catalyst can increase the surface area of the catalyst by dispersing the catalyst on the washcoat. There is a need for a washcoat that can be placed on the support to increase the surface area of the supported DPF catalyst.

SUMMARY OF THE INVENTION

One aspect of the present invention concerns a catalyst composition for reducing the ignition temperature of particulates from diesel exhaust. The catalyst composition contains:

a) at least one first component selected from the group consisting of cerium, a lanthanide, and mixtures thereof;

b) at least one second component selected from the group consisting of cobalt, copper, manganese and mixtures thereof; and c) at least one third component containing strontium, where the first component, the second component, and the third component are in an oxide form after calcination.

Advantageously, when the second component contains cobalt, a molar ratio of the first component to the second component to the third component may be in a range of 35-70:5-45:5-35; and when the second component contains manganese, a molar ratio of the first component to the second component to the third component may be in a range of 15-60:30-70:5-35. Preferably, when the second component contains a combination of manganese and copper, a molar ratio of manganese to copper may be in a range of 30-95 to 70-5.

Another aspect of the present invention concerns a catalyzed diesel particulate filter containing a substrate for filtering particulates from diesel engine exhaust; and a catalyst composition, where the catalyst composition contains:

a) at least one first component selected from the group consisting of cerium, a lanthanide, and mixtures thereof;

b) at least one second component selected from the group consisting of cobalt, copper, manganese and mixtures thereof; and c) at least one third component containing strontium, where the first component, the second component, and the third component are in an oxide form after calcination.

Advantageously, the substrate is selected from the group consisting of a woven fabric, a wire mesh, a disk filter, a ceramic honeycomb monolith, a ceramic foam, a metallic foam, and a wall flow filter. Preferably, the substrate may be made from a material selected from the group consisting of a metal, alumina, silica alumina, cordierite, silicon nitride, silicon carbide, sodium zirconium phosphate, and mullite.

In an embodiment, when the second component contains cobalt, a molar ratio of the first component to the second component to the third component may be in a range of 35-70:5-45:5-35; and when the second component contains manganese, a molar ratio of the first component to the second component to the third component may be in a range of 15-60:30-70:5-35. Advantageously, the first component, the second component, and the third component may initially be in the form of water-soluble salts. Preferably, the water-soluble salts may be dissolved in water to form an aqueous solution, and the aqueous solution may be impregnated into the substrate.

In an embodiment, the substrate may be calcined after the aqueous solution is impregnated into said substrate, thereby forming the catalyst composition. Advantageously, a loading of the catalyst composition on the catalyzed diesel particulate filter may be in a range of approximately 5 g/L to approximately 90 g/L, where the loading is on the basis of the oxides. In an embodiment, the catalyzed diesel particulate filter may also contain a washcoat on the substrate. Preferably, the catalyst composition may be supported on the washcoat. Advantageously, the washcoat may contain aluminum oxide. In an embodiment, the aluminum oxide may be applied to the substrate in a form of colloidal alumina.

In an embodiment, the colloidal alumina may be prepared with nano particle technology. Preferably, a loading of the washcoat may be in a range of approximately 5 g/L to approximately 100 g/L. In another embodiment, the aluminum oxide may be produced from aluminum nitrate. Advantageously, the washcoat may also contain at least one oxide selected from the group consisting of silica alumina, a zeolite, silica, cerium oxide, lanthanide oxide, zirconium oxide, and mixtures thereof.

Yet another aspect of the present invention concerns a method of removing particulates from exhaust gas from a diesel engine. The method may include contacting the exhaust gas with a catalyzed diesel particulate filter, thereby removing the particulates from the exhaust gas, where the catalyzed diesel particulate filter may contain a substrate and a catalyst composition, where the catalyst composition contains:

a) at least one first component selected from the group consisting of cerium and a lanthanide; and b) at least one second component selected from the group consisting of cobalt, copper, manganese and mixtures thereof, and c) at least one third component containing strontium, where the first component, the second component, and the third component are in an oxide form after calcination.

Advantageously, when the second component contains cobalt, a molar ratio of the first component to the second component to the third component may be in a range of 35-70:5-45:5-35; and when the second component contains manganese, a molar ratio of the first component to the second component to the third component may be in a range of 15-60:30-70:5-35.

Preferably, a loading of the catalyst composition on the catalyzed diesel particulate filter may be in a range of approximately 10 g/L to approximately 60 g/L, where the loading is on the basis of the oxides. In an embodiment, the catalyzed diesel particulate filter may also contain a washcoat. Preferably, the washcoat contains aluminum oxide. Advantageously the washcoat may also contain at least one oxide selected from the group consisting of silica alumina, a zeolite, silica, cerium oxide, lanthanide oxide, zirconium oxide, and mixtures thereof.

In an embodiment, the method may also include removing at least a portion of the particulates from the catalyzed diesel particulate filter by contacting the catalyzed diesel particulate filter with an oxidizing gas. Preferably, the oxidizing gas may be selected from the group consisting of $O_2$, NO, and $NO_2$. Advantageously, the catalyzed diesel particulate filter may be contacted with the oxidizing gas at a temperature of approximately 100° C. to approximately 800° C. Preferably, contacting the exhaust gas with the diesel oxidation catalyst may be before contacting the exhaust gas with the catalyzed diesel particulate filter.

Figure 2:
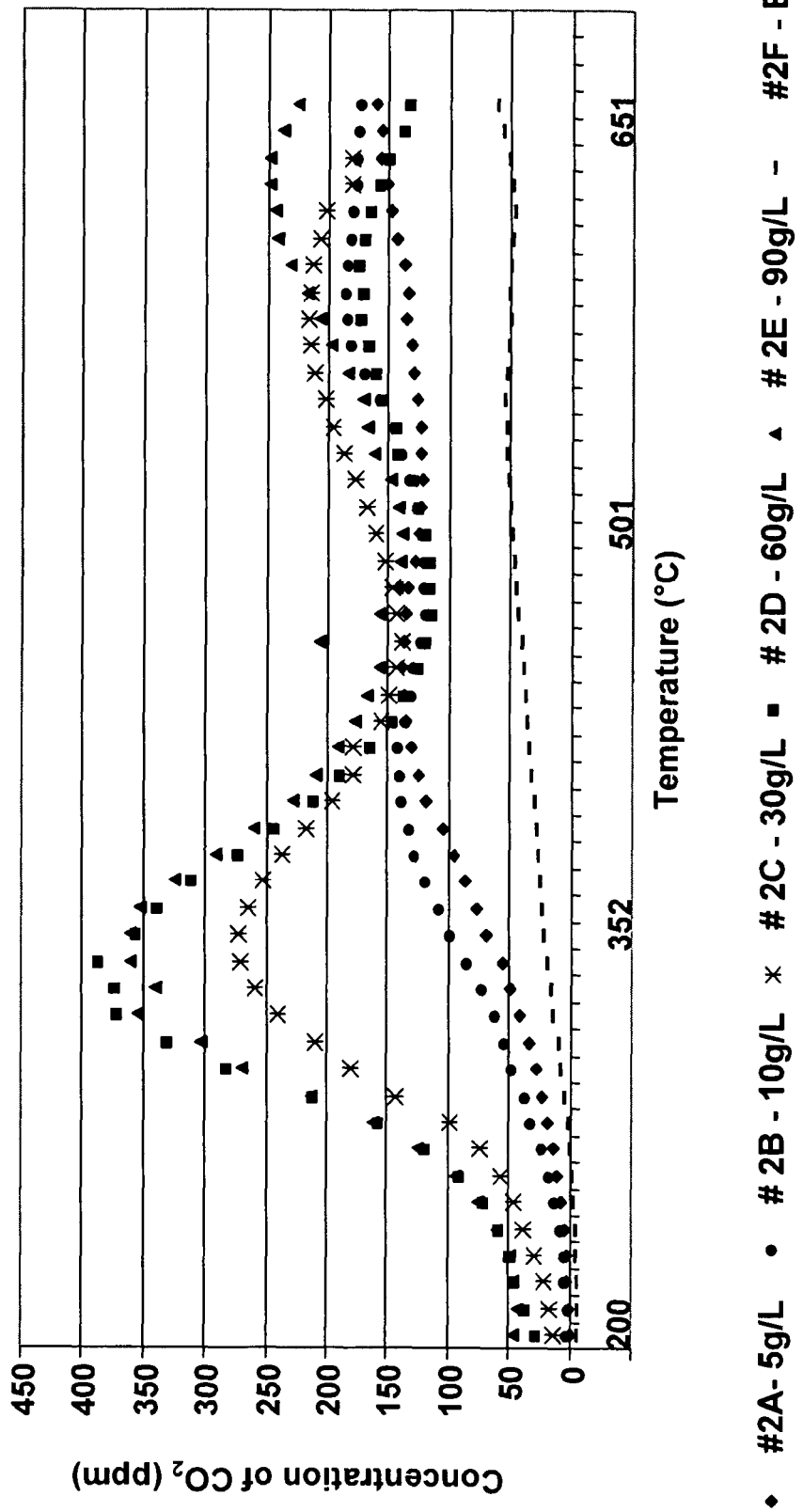

Curve 1A is a curve for a blank, a substrate that does not contain a catalyst according to an embodiment of the invention; and Curve 1B is a curve for a substrate with a catalyst according to an embodiment of the invention;

FIG. 2 shows a series of graphs of the $CO_2$ concentration versus temperature for diesel particulate filter substrates with a soot loading of about 2 g/L and various loadings of a catalyst composition according to an embodiment of the invention;

Curve 2A is a curve for a substrate with a catalyst loading of 5 g/L;

Curve 2B is a curve for a substrate with a catalyst loading of 10 g/L;

Curve 2C is a curve for a substrate with a catalyst loading of 30 g/L;

Curve 2D is a curve for a substrate with a catalyst loading of 60 g/L;

Curve 2E is a curve for a substrate with a catalyst loading of 90 g/L; and

Figure 3:
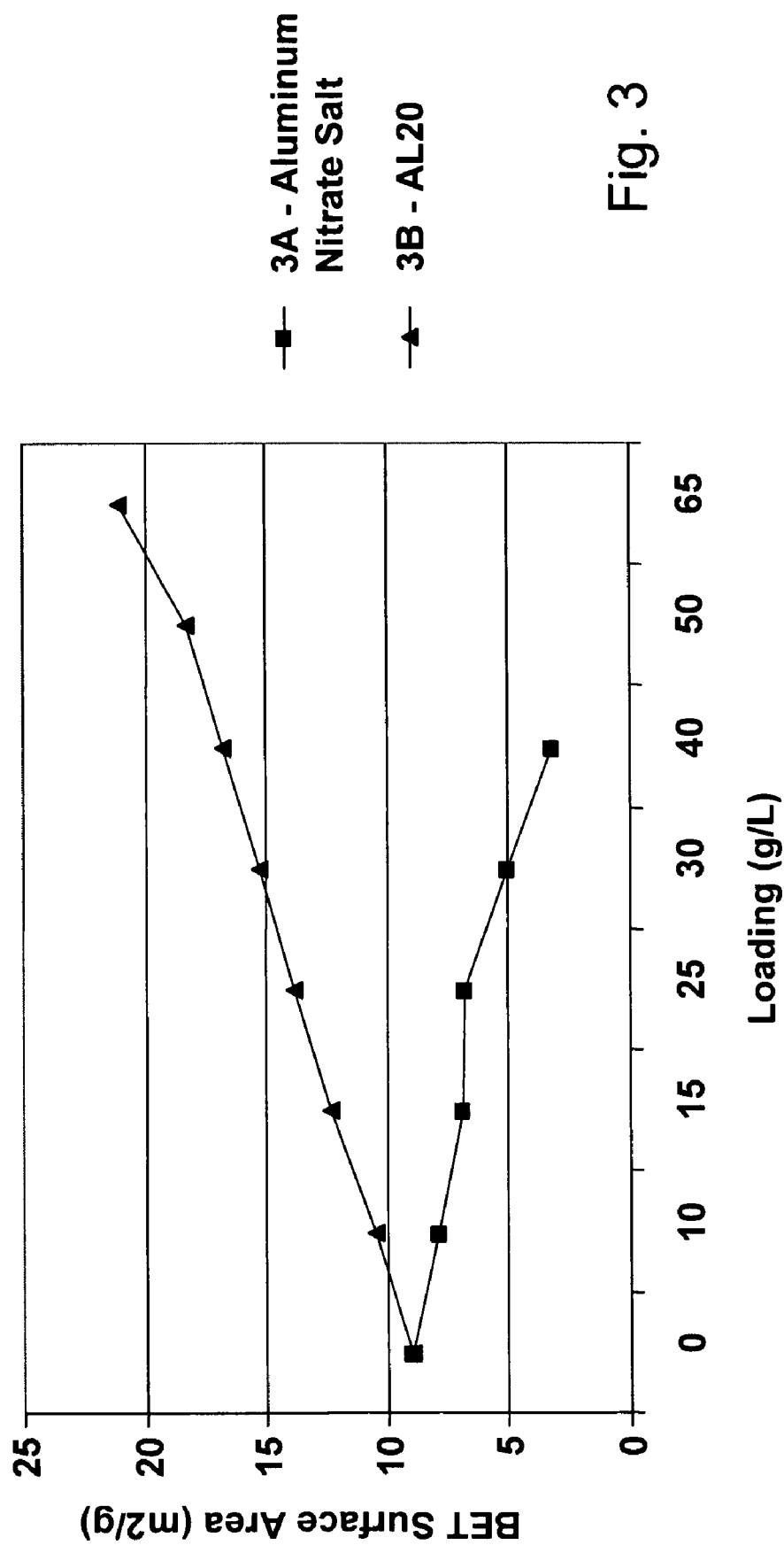
Figure 4:
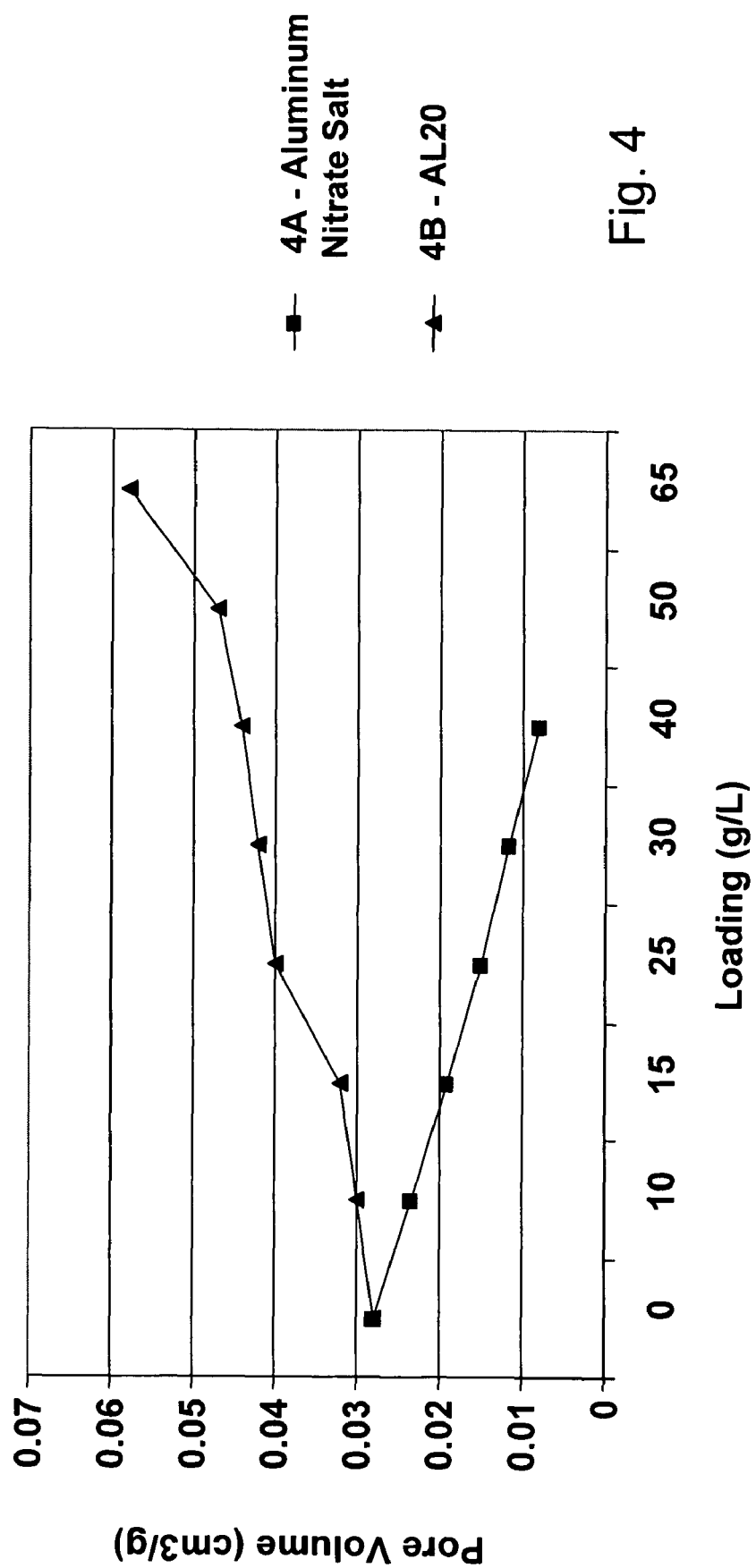
Figure 5:
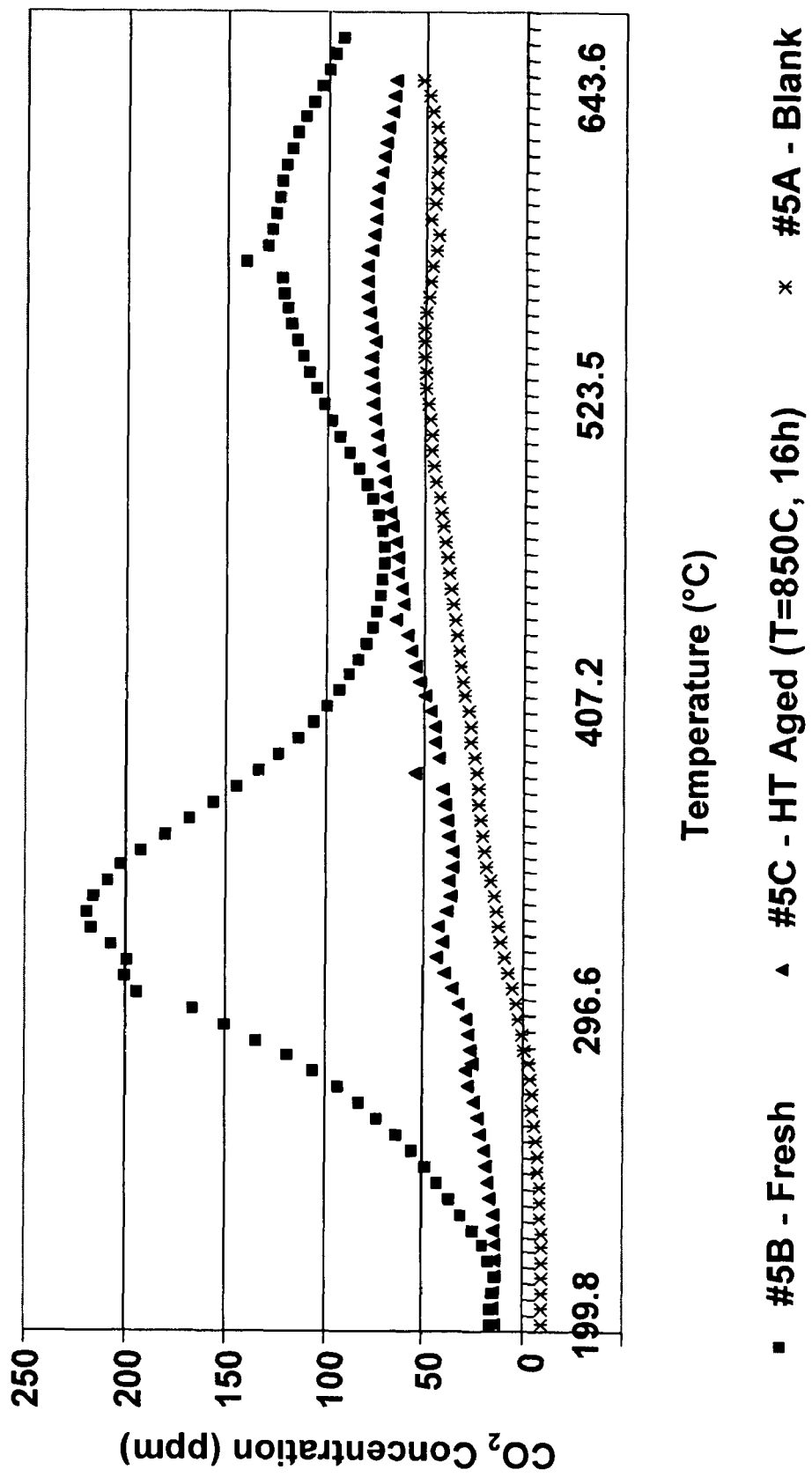
Figure 6:
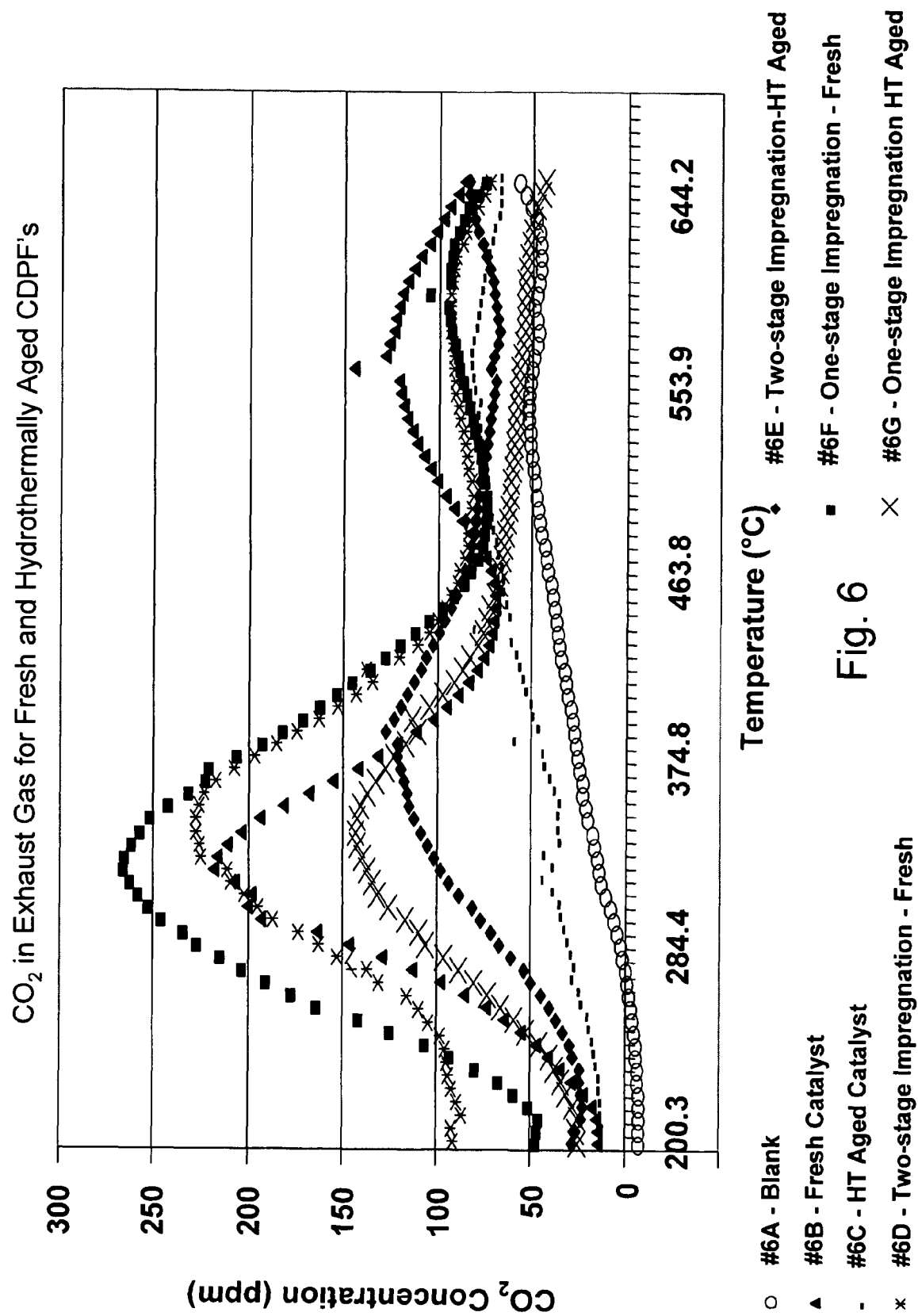

Curve 2F is a curve for a blank, a substrate that does not contain a catalyst;

FIG. 3 shows a series of graphs of the BET surface area in $m^2/g$ versus washcoat loading in g/L;

Curve 3A is a curve for an aluminum oxide washcoat prepared from aluminum nitrate; and Curve 3B is a curve for an aluminum oxide washcoat prepared with colloidal alumina;

FIG. 4 shows a series of graphs of the pore volume in $cm^3/g$ versus washcoat loading in g/L for aluminum oxide washcoats;

Curve 4A is a curve of the pore volume versus loading for an aluminum oxide washcoat prepared from aluminum nitrate; and Curve 4B is a curve of the pore volume versus loading for an aluminum oxide washcoat prepared with colloidal alumina;

FIG. 5 shows a series of graphs of the $CO_2$ concentration in ppm versus temperature in degrees Centigrade for various combinations of substrates and catalysts according to embodiments of the present invention;

Curve 5A is a curve for a blank, a substrate with no catalyst;

Curve 5B is a curve for a substrate with a fresh catalyst according to an embodiment of the invention; and Curve 5C is a curve for a substrate with the catalyst of curve 5B after hydrothermal aging at 850° C. for 16 hours;

FIG. 6 shows a series of graphs of the $CO_2$ concentration in ppm versus temperature in degrees Centigrade for various combinations of substrates and catalysts according to embodiments of the present invention;

Curve 6A is a curve for a blank, a substrate with no catalyst;

Curve 6B is a curve for a substrate with a fresh catalyst according to an embodiment of the invention;

Curve 6C is a curve for a substrate with the catalyst of Curve 6B after hydrothermal aging at 850° C. for 16 hours;

Curve 6D is a curve for a substrate impregnated in two stages, a first stage impregnation with a solution comprising colloidal alumina, and a second stage impregnation with a solution comprising a catalyst composition according to an embodiment of the invention;

Curve 6E is a curve for a substrate impregnated in two stages, as for Curve 6D, after hydrothermal aging at 850° C. for 16 hours;

Curve 6F is a curve for a substrate impregnated with a single solution comprising both colloidal alumina and a catalyst composition according to an embodiment of the invention; and Curve 6G is a curve for a substrate impregnated with a single solution, as for Curve 6F, after hydrothermal aging at 850° C. for 16 hours.

DETAILED DESCRIPTION OF THE PREFERRED EMBODIMENTS

Embodiments of the present invention provide catalyst compositions and methods for lowering the ignition temperature of particulates on diesel particulate filters (DPFs). The catalyst compositions may not contain platinum group metals (PGMs) or vanadium, though PGMs or vanadium may be added to the catalyst composition in some embodiments. PGMs are expensive, and vanadium compounds are volatile and toxic. The catalyst compositions may be supported on a washcoat on the DPF in some embodiments. Some embodiments of the washcoat may provide increased hydrothermal stability to the catalyst composition, as shown in the examples below.

The particulate matter on the DPF may comprise three main fractions, a solid fraction, a soluble organic fraction, and sulfates. The solid fraction may comprise about 54% of the particulate matter, the soluble organic fraction about 32% of the particulate matter, and the sulfates about 14% of the particulate matter.

The solid fraction (hereafter SOL) may comprise about 41% carbon and about 13% ash, a total of about 54% of the particulate matter. The carbon may have an ignition temperature of about 600° C. or higher, in the absence of a catalyst.

The soluble organic fraction (hereafter SOF) may comprise about 7% fuel SOF and 25% lube SOF, a total of about 32% of the particulate matter. The SOF may have an ignition temperature of about 350° C., in the absence of a catalyst.

A complex series of reactions may take place when the DPF is regenerated by oxidizing the particulates. The carbon can be removed from the DPF with the following reactions:

$C+O_2=CO_2$

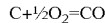

$C+\frac{1}{2}O_2=CO$

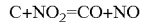

$C+NO_2=CO+NO$

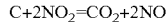

$C+2NO_2=CO_2+2NO$

The reactions of carbon with $NO_2$ (nitrogen dioxide) may occur more rapidly and at a lower temperature than the reactions of carbon with the $O_2$ in the exhaust gas. High concentrations of $NO_2$ in the exhaust stream may therefore increase both the efficiency and the rate of carbon removal from the DPF.

A diesel oxidation catalyst (DOC) may be placed upstream of the DPF to catalyze the following reactions:

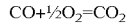

$CO+\frac{1}{2}O_2=CO_2$

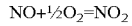

$NO+\frac{1}{2}O_2=NO_2$

Oxidizing the carbon monoxide in the exhaust gas to carbon dioxide may decrease the CO levels in the exhaust gas. The low CO concentration in the exhaust gas after the exhaust gas passes through the DOC may be beneficial in helping to meet CO emission limits. Oxidizing the NO in the exhaust gas to $NO_2$ may increase the concentration of $NO_2$ in the exhaust gas. The high $NO_2$ concentration in the exhaust gas after the exhaust gas passes through the DOC may improve the efficiency of carbon removal from the DPF.

Placing a catalyst composition according to embodiments of the present invention on the DPF to form a catalyzed diesel particulate filter (CDPF) may lower the temperature at which the DPF may be regenerated by oxidizing the particulates on the DPF. The catalyst compositions according to embodiments of the invention may comprise at least one first component selected from the group consisting of cerium, a lanthanide, and mixtures thereof, at least one second component selected from the group consisting of cobalt, copper, manganese, and mixtures thereof, and at least one third component comprising strontium. The catalyst composition may also comprise other components, including, but not limited to, one or more components to stabilize the surface area of the first component selected from the group consisting of cerium, a lanthanide, and mixtures thereof.

When the second component comprises cobalt, the catalyst composition may comprise the first component, the second component, and the third component in a molar ratio of approximately 60:15:25. The molar ratio can be in a range of 35-75:5-45:5:35, more preferably 40-70:10-30:10-30, and most preferably 55-65:10-20:20-30.

When the second component comprises manganese, the catalyst composition may comprise the first component, the second component, and the third component in a molar ratio of approximately 35:50:15. The molar ratio can be in a range of 15-60:30-70:5:35, more preferably 25-45:40-60:10-30, and most preferably 30-40:45-55:10-20.

In an embodiment where the second component comprises copper in addition to manganese the molar ratio of manganese and copper comprising the second component can be in a range of approximately 80:20. The molar ratio can be in a range of 30-95:70:5, more preferably 50-95:50:5, and most preferably 70-95:30:5.

The ranges of the molar ratios of the first component, the second component, and the third component may be the same when the second component comprises a mixture of copper and manganese as when the second component comprises manganese without copper.

In an embodiment, the cerium component may comprise $CeO_2$. The lanthanide component can comprise $Ln_2O_3$, where Ln is at least one lanthanide. In an embodiment, the cobalt component can comprise $Co_3O_4$. In an embodiment, the strontium component can comprise SrO. The copper component may comprise $Cu_2O$ or CuO. The manganese can comprise $Mn_2O_3$, $MnO_2$, or mixtures thereof. Other oxides or compounds of cerium, lanthanides, cobalt, manganese, and strontium may be utilized in alternative embodiments. Complex oxides of cerium oxide, lanthanide oxide, cobalt oxide, copper oxide, manganese oxide, and strontium oxide may also be suitable.

The DPF may comprise a substrate. The substrate of the DPF can be any suitable filter for particulates. Some suitable forms of substrates may include woven filters, particularly woven ceramic fiber filters, wire meshes, disk filters, ceramic honeycomb monoliths, ceramic or metallic foams, wall flow filters, and other suitable filters. Wall flow filters are similar to honeycomb substrates for automobile exhaust gas catalysts. They may differ from the honeycomb substrates that may be used to form normal automobile exhaust gas catalysts in that the channels of the wall flow filter may be alternately plugged at an inlet and an outlet so that the exhaust gas is forced to flow through the porous walls of the wall flow filter while traveling from the inlet to the outlet of the wall flow filter. The particulates may be deposited onto the CDPF and may thereby be removed from the exhaust gas.

The substrate may be made from a variety of materials. Materials that withstand high temperatures may be preferable, because burning the particulates on the filter can subject the substrate to high temperatures. Some suitable high temperature materials for forming the substrate of the diesel particulate filter can include, but are not limited to, a metal, alumina, silica alumina, cordierite, silicon nitride, silicon carbide, sodium zirconium phosphate, mullite, and other appropriate high temperature materials known to one skilled in the art. Suitable metals may include, but are not limited to, steels and specialty steels.

A catalyzed diesel particulate filter (CDPF) may comprise a catalyst composition according to embodiments of the present invention and a DPF. The catalyst composition may be placed on the DPF to form the CDPF in any suitable manner.

In an embodiment, a loading of the catalyst composition on the catalyzed diesel particulate filter (CDPF) may be in a range of approximately 5 g/L to approximately 90 g/L, where the loading of the catalyst composition is on the basis of the oxides.

Catalyst loadings of 5 g/L, 10 g/L, 30 g/L, 60 g/L, and 90 g/L may be effective in reducing the ignition temperature of the particulates on the catalyzed particulate filter, as shown in the examples below. Loadings of the catalyst composition less than approximately 5 g/L may not be as effective in reducing the ignition temperature of the particulates on the catalyzed diesel particulate filter as higher loadings, at least for the catalyst compositions, substrates, and operating conditions that were tested in the examples.

Successively increasing the catalyst loading on the CDPF from 5 g/L to 60 g/L may improve the effectiveness of the oxidation of the particulates. Further increasing the catalyst loading above 60 g/L may not significantly improve the effectiveness of the catalyst composition in oxidizing the particulates, as shown in the examples below. Catalyst loadings in the range of 5 g/L to 60 g/L may be optimal, at least for the embodiments of catalysts and substrates that are described in the examples. Catalyst loadings above 60 g/L may not be any more effective in oxidizing the particulate matter on the CDPF than catalyst loadings in the range of approximately 5 g/L to approximately 60 g/L.

The optimal catalyst loadings on the CDPF may depend on the type of substrate that is used. A range of approximately 5 g/L to approximately 60 g/L may be optimal for a cordierite substrate. Different catalyst loadings may be optimal for other substrates. Different catalyst loadings may also be optimal for other formulations of the catalyst composition.

Although not wishing to be tied to a theory, it is believed that sintering of the catalyst composition may take place when the catalyst loading on the CDPF is greater than approximately 60 g/L, at least for a cordierite substrate and the catalyst compositions that were tested in the examples below. Sintering of the catalyst composition may reduce the effectiveness of the catalyst composition in lowering the ignition temperature of the particulates on the CDPF.

In an embodiment, a washcoat may be placed onto the DPF. In some embodiments, the catalyst composition may be supported on the washcoat. The washcoat may comprise at least one component selected from the group consisting of alumina, silica-alumina, a zeolite, silica, a lanthanide, a mixture of lanthanides, cerium oxide, zirconium oxide, mixtures or solid solutions of cerium oxide, lanthanide oxide, and zirconium oxide, a stabilizer, and other suitable washcoat components well known to those skilled in the art. The washcoat may comprise oxides, precursor salts of oxides, or a mixture of oxides and precursor salts of oxides.

Advantageously, the washcoat may comprise aluminum oxide. In an embodiment, the aluminum oxide in the washcoat may be prepared from aluminum nitrate. Calcining the aluminum nitrate may form aluminum oxide. In an alternative embodiment, the aluminum oxide in the washcoat may comprise colloidal aluminum oxide. Although the aluminum oxide may be applied to the substrate as colloidal aluminum oxide or alumina, a phase transition may take place in the colloidal alumina when the substrate and the alumina washcoat are calcined.

A loading of aluminum oxide in the washcoat on the DPF may be in a range of approximately 5 to approximately 100 g/L, more preferably approximately 10 g/L to approximately 80 g/L, and most preferably approximately 10 g/L to approximately 65 g/L, all on the basis of $Al_2O_3$. The washcoat may comprise other components in addition to the alumina. In some embodiments, the washcoat may not comprise alumina.

As shown in the examples below, the BET surface areas and the pore volumes of washcoats prepared with colloidal alumina may be higher than the BET surface areas and pore volumes of aluminum oxide washcoats prepared from aluminum nitrate.

It may generally be desirable that washcoats have high BET surface areas and pore volumes. For example, catalysts that are supported on washcoats that have high surface areas and pore volumes may have higher surface areas and/or activities than catalysts that are supported on washcoats that have low surface areas and pore volumes. Forming washcoats with colloidal alumina may generally be preferable to forming washcoats from alumina prepared from aluminum nitrate.

In an embodiment, the colloidal alumina may comprise a colloidal dispersion of aluminum oxide. Advantageously, the colloidal dispersion of aluminum oxide may be prepared with nano particle technology. Various forms of colloidal dispersions of aluminum oxide may be suitable for preparing washcoats on the DPF substrate.

One suitable form of colloidal alumina may be NYACOL® AL20, commercially available from Nyacol Nano Technologies, Inc., Ashland, Mass. 01721. NYACOL® AL20 is a 20 wt % dispersion of colloidal alumina with a particle size of approximately 50 nm. Other forms of colloidal alumina may also be suitable for forming washcoats on the DPF. Although the alumina may be applied to the substrate as colloidal alumina, calcining the colloidal alumina may lead to phase changes in the colloidal alumina. The calcined colloidal alumina may comprise, for example, gamma, eta, theta, delta, alpha alumina, or mixtures thereof. The calcined colloidal alumina may comprise any suitable phase of alumina.

As shown in the examples below, a washcoat that comprises alumina may increase the hydrothermal stability of the catalyst composition according to embodiments of the present invention.

The washcoat may further comprise oxides or precursors of oxides, such as, but not limited to, cerium oxides, zirconium oxides, zeolites, lanthanide oxides, or mixtures, solid solutions, or complex oxides thereof. The precursors of the oxides may be converted to the corresponding oxides when the precursors are calcined.

The first component, the second component, and the third component that may form the catalyst composition according to embodiments of the present invention may be oxides or salts. The salts may generally be converted to oxides when calcined.

A variety of precursor salts of the catalyst composition can be used. Some suitable forms of precursor salts for the catalyst composition may include, but are not limited to, chloride salts, nitrate salts, acetate salts, citrate salts, or acetylacetonate salts. The precursor salts may be converted into the catalyst composition when the precursors of the catalyst composition are calcined.

In an embodiment, each of the catalyst composition precursor salts may be calcined separately to form oxides. The oxides may be mixed to form the catalyst composition. In an alternative embodiment, two or more of the catalyst composition precursor salts may be mixed, and the mixture of catalyst composition precursor salts may be calcined to form the catalyst composition. In another embodiment, all of the catalyst composition precursor salts may be mixed before the mixture is calcined. The mixture of catalyst composition precursor salts may comprise a mixture of solid catalyst composition precursor salts, an aqueous solution of water-soluble catalyst composition precursor salts, or a combination of solid catalyst composition precursor salts and a solution containing water-soluble catalyst composition precursor salts. In an embodiment, the catalyst composition may be formed prior to being placed on the DPF.

In an embodiment, water-soluble precursor salts of the catalyst composition may be dissolved in water to form an aqueous solution, and the aqueous solution containing the water-soluble precursor salts of the catalyst composition may be impregnated into the DPF substrate and/or the washcoat on the substrate. The aqueous solution of the catalyst composition precursor salts may be dried to remove the water. Calcining the catalyst composition precursor salts may convert the precursor salts into oxides, thereby forming the catalyst composition. In an embodiment, a washcoat may be placed onto the DPF before, after, or at the same time as the aqueous solution of the precursor salts is impregnated into the DPF substrate. The aqueous solution may be impregnated into the DPF, the washcoat, or both the DPF and the washcoat. In some embodiments, the catalyst composition may be supported on the washcoat on the substrate.

Calcination of the water-soluble salts may convert the water-soluble salts into the corresponding oxides. The calcination may generally be performed at a temperature of approximately 550° C. The calcination may be performed at a temperature of approximately 150° C. to approximately 850° C., more preferably approximately 200° C. to approximately 800° C., and most preferably approximately 450° C. to approximately 750° C.

In an embodiment, a precipitating agent may be added to an aqueous solution comprising at least one water-soluble precursor salt of the catalyst composition. The at least one catalyst precursor salt may be precipitated by the precipitating agent.

Suitable precipitating agents may include, but are not limited to, ammonium hydroxide and an alkali hydroxide. Calcining the precipitated precursor salt of the catalyst composition may convert the precipitated precursor salt of the catalyst composition into the corresponding oxide. The oxide or oxides may be combined with other salts or oxides as described previously to form the catalyst composition.

Other methods of forming the catalyst composition and the washcoat may also be suitable. Suitable methods of forming the catalyst composition and the washcoat are known to those skilled in the art.

In an embodiment, a method is provided for removing particulates from exhaust gas from a diesel engine. The method may comprise contacting the exhaust gas with a catalyzed particulate filter (CDPF), where the catalyzed particulate filter comprises a substrate and a catalyst composition according to an embodiment of the invention. A suitable catalyst composition may comprise at least one first component selected from the group consisting of cerium, a lanthanide, and mixtures thereof at least one second component selected from the group consisting of cobalt, copper, manganese, and mixtures thereof, and a third component comprising strontium. When the second component comprises cobalt, the first component, the second component, and the third component may be in a molar ratio of approximately 60:15:25, more preferably in a molar ratio of 55-65:10-20:20-30.

When the second component comprises manganese, the first component, the second component, and the third component may be in a molar ratio of approximately 35:50:15 more preferably in a molar ratio of 30-40:45-55:10-20.

When the second component comprises a combination of manganese and copper, the molar ratios of the first component, the second component, and the third component may be in the same molar ratios as when the second component comprises manganese without copper.

Contacting the exhaust gas and particulates with the CDPF may remove at least a portion of the particulates from the exhaust gas. The particulates may be deposited on the CDPF, thereby removing them from the exhaust gas.

Contacting the CDPF and the particulates that were deposited on the CDPF with an oxidizing gas such as oxygen or $NO_2$ may remove at least a portion of the particulates from the CDPF by oxidizing the particulates on the CDPF. It is believed that NO may act as an oxidizing gas under some circumstances. Although not wishing to be bound by a theory, it is believed that at least a portion of the NO may be oxidized to $NO_2$ in the presence of the catalyst composition of the present invention. In the context of this application, NO, $NO_2$, and $O_2$ are all considered to be oxidizing gases. The catalyst composition according to an embodiment of the invention may reduce the temperature at which the particulates are oxidized when the CDPF and particulates are contacted with the oxidizing gas.

The particulates and CDPF may be contacted with the oxidizing gas at temperatures of approximately 100° C. to approximately 800° C., more preferably temperatures of approximately 150° C. to approximately 750° C., and most preferably temperatures of approximately 200° C. to approximately 700° C.

The method may further comprise contacting the exhaust gas with a diesel oxidation catalyst (DOC) before contacting the exhaust gas with the CDPF. Contacting the exhaust gas with the DOC may increase the amount of $NO_2$ in the diesel exhaust gas by oxidizing NO to $NO_2$.

The $NO_x$ in the exhaust gas before the exhaust gas passes through the DOC may generally comprise about 5-10% NO and about 90-95% $NO_2$. After passing through the DOC, the $NO_x$ in the exhaust gas may comprise approximately 50% NO and about 50% $NO_2$. The ratio can, of course, vary, depending on the composition and the operating conditions of the DOC and the operating conditions of the diesel engine.

Contacting the exhaust gas with the DOC prior to contacting the exhaust gas with CDPF to increase the amount of $NO_2$ in the exhaust gas prior to contacting the exhaust gas with the particulates on the CDPF is another embodiment of the method of the present invention. The increased $NO_2$ concentration in the exhaust gas after the exhaust gas contacts the DOC may improve the removal efficiency of particulates from the CDPF.

The following examples illustrate embodiments of various aspects of the invention. The examples are not meant to be limiting on the scope of the claims.

EXAMPLES

Loading of Soot onto the Substrates

Exhaust gas from a Honda diesel generator (Model No. EB12D) was contacted with the diesel particulate filter substrates until the substrates were loaded with approximately 2 g/L of soot.

Example 1

Measurement of the $CO_2$ Concentration in the Offgas from the Soot-Loaded Substrate as a Function of Temperature Soot-loaded DPF substrates were contacted with a gas stream that comprised about 10% oxygen, about 8% water, about 150 ppm NO, and about 150 ppm $NO_2$. The temperature of the substrate was increased from 200° C. to 650° C. or 700° C., and the concentration of $CO_2$ in the exhaust gas was monitored as a function of temperature.

Figure 1:
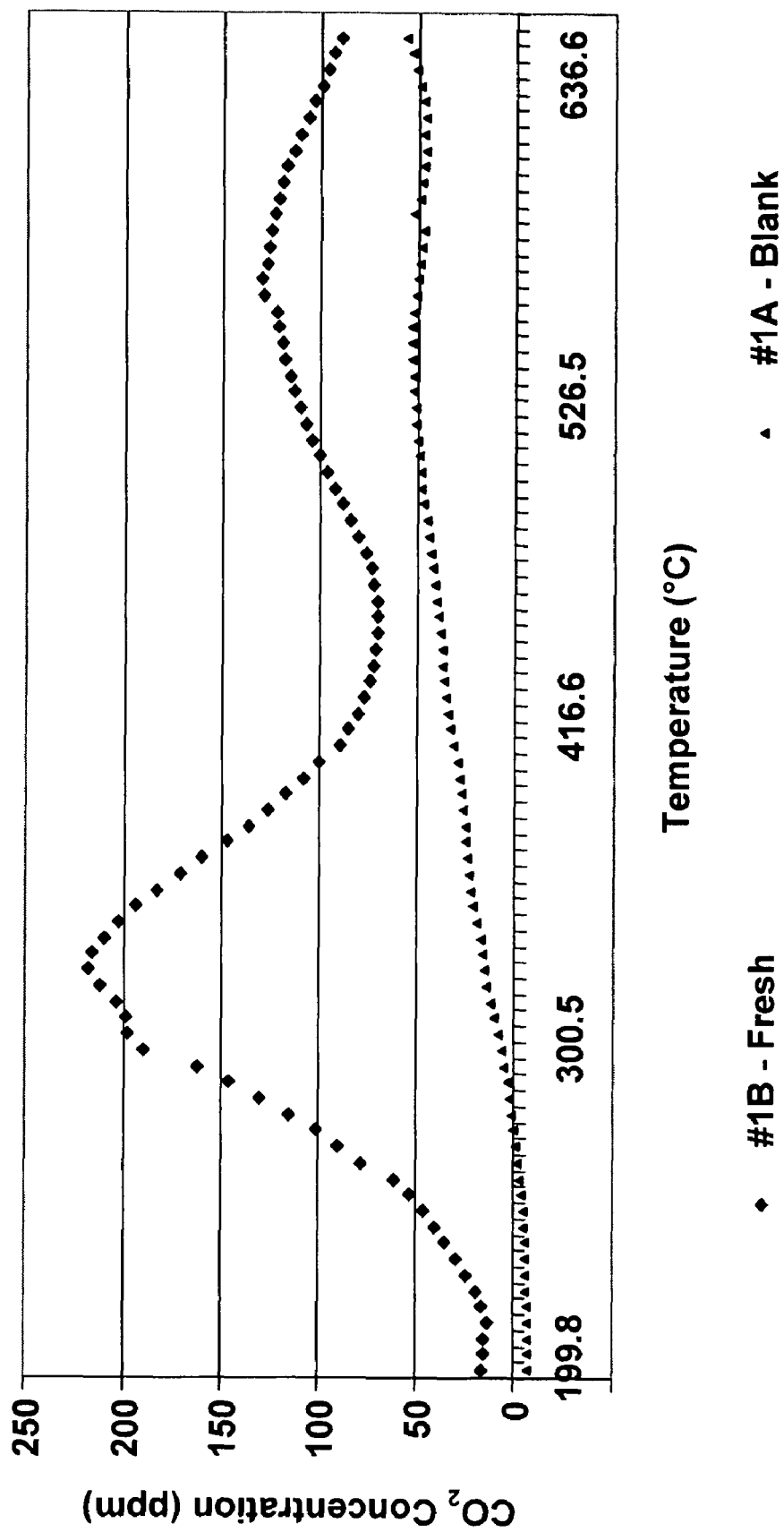
FIG. 1 shows a series of graphs of the $CO_2$ concentration versus temperature for diesel particulate filter substrates with soot loadings of about 2 g/L.

FIG. 1 shows a graph of the concentration of $CO_2$ in the exhaust stream versus temperature for a substrate that had been loaded with 2 g/L of soot, with and without a catalyst composition according to an embodiment of the invention. FIG. 1A, the lower curve of FIG. 1, is a graph of the $CO_2$ concentration in the exhaust gas with a blank substrate, a soot-loaded cordierite substrate that does not contain a catalyst composition according to an embodiment of the invention. The catalyst compositions of Examples 1-5 comprise cerium, cobalt, and strontium in an approximate molar ratio of 60:15:25.

FIG. 1B, the upper curve of FIG. 1, shows the concentration of $CO_2$ in the exhaust gas for a soot-loaded cordierite substrate that contained approximately 30 g/L of a catalyst composition according to an embodiment of the invention. There are two peaks in $CO_2$ concentration with the sample comprising 30 g/L of catalyst at approximately 345° C. and approximately 580° C. The low temperature peak for the blank sample occurred at approximately 550° C. Although a high temperature $CO_2$ peak is not observed for the blank sample in FIG. 1, the presence of a second high temperature peak is suggested by the rise in the $CO_2$ concentration at the right hand side of FIG. 1. If a high temperature peak is present in the blank sample, it may occur at a temperature of greater than 650° C.

The low temperature peak for the sample that comprised 30 g/L of the catalyst according to an embodiment of the present invention occurred at approximately 345° C., compared to approximately 550° C. for the blank sample that did not contain a catalyst composition according to an embodiment of the invention. Adding a catalyst composition according to an embodiment of the invention to the sample lowered the temperature of the low temperature $CO_2$ peak by about 205° C.

Further, the $CO_2$ concentration in the low temperature peak for the sample containing a loading of 30 g/L of a catalyst composition according to an embodiment of the invention was about 220 ppm, compared to about 50 ppm for the blank sample that did not contain a catalyst composition according to an embodiment of the invention. The amount of $CO_2$ in the exhaust gas may be a measure of the amount of particulate matter that is oxidized. High levels of $CO_2$ in the exhaust gas may indicate more complete oxidation of the particulates than when low levels of $CO_2$ are present in the exhaust gas.

The increased amount of $CO_2$ in the exhaust gas and the lower burn off temperature for the sample with the catalyst composition according to an embodiment of the invention are showings of the effectiveness of the catalyst composition in increasing the rate and the effectiveness of the oxidation of the particulate matter.

Some of the $CO_2$ in the offgas in the low temperature peak for the blank may be due to oxidation of the particulates by $NO_2$ rather than $O_2$. The $NO_2$ in the offgas may react more readily with the particulates than does the $O_2$ in the exhaust gas. More information is needed to determine how much of the particulates are oxidized by the $NO_2$ and how much are oxidized by $O_2$. $O_2$ and $NO_2$ may both be oxidizing gases. It is believed that NO may also be an oxidizing gas in the presence of the catalyst according to embodiments of the present invention.

Example 2

Effect of Catalyst Loading on the $CO_2$ Concentration in the Offgas

FIG. 2 shows a series of curves for the concentration of $CO_2$ versus temperature for substrates with various loadings of a catalyst according to an embodiment of the invention. All of the loadings are on the basis of the oxides.

Curve 2A is a curve for a substrate with a catalyst loading of 5 g/L, curve 2B for a catalyst loading of 10 g/L, curve 2C for a catalyst loading of 30 g/L, curve 2D for a catalyst loading of 60 g/L, curve 2E for a catalyst loading of 90 g/L, and curve 2F is a curve for a blank, a substrate that does not contain a catalyst.

As shown in curve 2A, the low temperature $CO_2$ peak for a substrate with a catalyst loading of 5 g/L occurred at about 450° C., compared to about 550° C. in the blank (curve 1A). Increasing the catalyst loading to 10 g/L decreased the temperature of the low temperature peak to about 425° C., as shown in curve 2B. Increasing the catalyst loading from 5 g/L to 10 g/L decreased the peak temperature by about 25° C. The $CO_2$ concentration in the low temperature $CO_2$ peak with the catalyst loading of 10 g/L was 140 ppm, compared to 130 ppm for a catalyst loading of 5 g/L. A catalyst loading of 10 g/L on the CDPF was more effective at catalyzing oxidation of the particulate matter than a catalyst loading of 5 g/L, as shown by the lower temperature of the low temperature $CO_2$ peak and the higher $CO_2$ concentration in the low temperature peak with the higher catalyst loading.

As shown in curve 2C, further increasing the catalyst loading to 30 g/L led to a decrease in temperature of the low temperature $CO_2$ peak to about 345° C., a decrease of about 60° C. from the peak temperature of 405° C. for a catalyst loading of 10 g/L. Further, the $CO_2$ concentration in the low temperature peak increased from about 140 ppm to about 270 ppm with the higher catalyst loading of 30 g/L.

Further increasing the loading from 30 g/L to 60 g/L led to a decrease in the peak temperature of the low temperature $CO_2$ peak from about 345° C. to about 330° C., as shown by curve 2D, a decrease of about 15° C. in the peak temperature with a doubling of the catalyst loading. The concentration of $CO_2$ in the offgas increased from about 270 ppm to about 380 ppm when the catalyst loading was increased from 30 g/L to 60 g/L.

Further increasing the catalyst loading from 60 g/L in curve 2C to 90 g/L in curve 2D did not significantly change the temperature at which the low temperature peak occurred. The effectiveness of the catalyst may plateau at catalyst loadings between 60 g/L and 90 g/L, at least for the catalyst formulations that were used in the examples. Although not wishing to be bound to a theory, it is believed that sintering of the catalyst may take place when catalyzed diesel particulate filters with high catalyst loadings, for example, 90 g/L, are subjected to high temperatures. The optimal loading of the catalyst composition on the CDPF may depend on a tradeoff between the desired reduction in ignition temperature and increased oxidation of SOF and SOL as the loading of the catalyst composition is increased versus the increased cost for the higher catalyst loading.

Beneficial effects may be seen for catalyst loadings as low as approximately 5 g/L and up to approximately 60 g/L. Further increasing the catalyst loading to 90 g/L may not improve the activity. A catalyst loading in the range of 10-60 g/L may provide significant enhancement in oxidation of the SOF and SOL with a minimal degree of catalyst sintering. The optimal catalyst loading may depend on the substrate, the catalyst, and the operating conditions.

Example 3

Surface Areas and Pore Volumes of Aluminum Oxide Washcoats Prepared from Aluminum Nitrate and Colloidal Alumina FIG. 3 shows graphs of the BET surface areas in $m^2/g$ versus target loading in g/L for aluminum oxide washcoats prepared from aluminum nitrate and colloidal alumina.

Curve 3A of FIG. 3 shows a graph of the BET surface area versus loading for the aluminum oxide washcoats prepared from aluminum nitrate. Curve 3B of FIG. 4 shows a graph of the surface area versus loading for aluminum oxide washcoats prepared with NYACOL® AL20 colloidal alumina.

As shown in curve 3A, the BET surface area of a substrate that comprised alumina washcoats prepared from aluminum nitrate decreased from about 8 m$^2$/g to about 3 m$^2$/g as the target loading was increased from 0 to about 40 g/L. The BET surface areas with alumina washcoats that were prepared with colloidal alumina were higher than the BET surface areas of the corresponding alumina washcoats that were prepared with aluminum oxide prepared from aluminum nitrate at all loadings of aluminum oxide.

In contrast, as shown in curve 3B, the BET surface area for a substrate loaded with an alumina washcoat prepared with NYACOL® AL20 colloidal alumina increased from 8 m$^2$/g to 22 m$^2$/g as the target loading was increased from 0 to 65 g/L.

FIG. 4 shows similar plots of the pore volume in cm$^3$/g versus target loading in g/L for washcoats comprising aluminum oxide prepared from aluminum nitrate and from NYACOL® AL20 colloidal alumina. Curve 4A is a curve for the washcoat comprising aluminum oxide prepared from aluminum nitrate. Curve 4B is a curve for the washcoat comprising colloidal alumina. As shown in curve 4A, the pore volume of washcoats prepared from aluminum nitrate decreased from 0.28 cm$^3$/g to 0.008 cm$^3$/g as the target loading increased from 0 to 40 g/L.

In contrast, as shown in curve 4B, the pore volume for aluminum oxide washcoats prepared with NYACOL® AL20 colloidal alumina increased from 0.28 cm$^3$/g to 0.58 cm$^3$/g as the loading increased from 0 to 65 g/L. The pore volumes with alumina washcoats that were prepared with colloidal alumina were higher than the pore volumes of the corresponding alumina washcoats that were prepared with aluminum oxide prepared from aluminum nitrate at all loadings of aluminum oxide, as shown in FIG. 4.

The BET surface areas and pore volumes of the washcoats prepared with aluminum oxide comprising colloidal alumina were higher than the surface areas and pore volumes of the washcoats prepared with aluminum oxide prepared from aluminum nitrate.

Preparing washcoats from colloidal alumina rather than aluminum oxide prepared from aluminum nitrate may provide washcoats with higher surface areas and higher pore volumes than washcoats prepared with aluminum oxide prepared from aluminum nitrate. High surface areas and pore volumes may generally be desirable characteristics for washcoats. Washcoats prepared with colloidal alumina may therefore have advantages over washcoats prepared with aluminum oxide prepared from aluminum nitrate.

Example 4

Hydrothermal Stability of the Catalyst Composition

FIG. 5 shows a series of curves for the CO$_2$ concentration in the exhaust gas versus temperature for soot-loaded substrates. Curve 5A is a curve for a blank, a substrate with no catalyst. Curve 5B is a curve for a substrate with a loading of 30 g/L of a catalyst composition according to an embodiment of the invention. Curve 5C is a curve for a substrate with a loading of 30 g/L of a catalyst composition according to an embodiment of the invention after hydrothermal aging at 850° C. for 16 hours.

Hydrothermal aging involves the following procedure. The catalyst was placed in an oven in a 10% H$_2$O/air atmosphere at 850° C. for 16 hours. The catalyst was removed from the oven and was allowed to cool to room temperature in air.

The low temperature CO$_2$ peak for the blank sample occurred at about 550° C. The low temperature CO$_2$ peak for the substrate with the fresh catalyst composition according to an embodiment of the present invention occurred at about 340° C., about 210° C. lower than the peak for the blank.

The CO$_2$ concentration in the exhaust gas for the blank was about 0-50 ppm, compared to about 220 ppm for the substrate with a loading of about 30 g/L of the catalyst according to an embodiment of the invention. High levels of CO$_2$ in the exhaust gas may be an indication of more complete oxidation of the particulates on the substrate. The catalyst according to an embodiment of the invention was effective at catalyzing the oxidation of the particulates with the oxidizing gases, as shown by the higher CO$_2$ levels in the exhaust gas with the catalyst according to embodiments of the present invention.

Curve 5C shows the curve of CO$_2$ concentration versus temperature for a substrate with a loading of about 30 g/L of a catalyst composition according to an embodiment of the invention after hydrothermal aging at 850° C. for 16 hours. As shown in FIG. 5, the activity of the hydrothermally aged catalyst may not be significantly different from the blank.

Hydrothermal aging significantly lowered the effectiveness of the CDPF in catalyzing the oxidation of particulates.

Example 5

Hydrothermal Stability of the Catalyst Composition in the Presence of Alumina

FIG. 6 shows a series of graphs of the CO$_2$ concentration in ppm versus temperature for soot-loaded substrates. Curves 6A, 6B, and 6C are the same as curves 5A, 5B, and 5C and are curves for a blank substrate, a substrate with fresh catalyst (a fresh CDPF), and a hydrothermally aged CDPF.

Curve 6D is a curve for a substrate that had been impregnated in two stages. The substrate was impregnated with AL20 (colloidal NYACOL® AL20) in a first stage and with an aqueous solution containing a catalyst composition according to an embodiment of the invention in a second stage.

Curve 6E is a curve for a substrate that was impregnated with AL20 and an aqueous solution of the catalyst composition according to an embodiment of the invention in two stages, as for curve 6D, after hydrothermal aging.

Curve 6F is a curve for a substrate impregnated in a single stage with a solution containing both AL20 and a solution of the catalyst composition according to an embodiment of the invention.

Curve 6G is a curve for a substrate that was impregnated in a single stage with AL20 and a solution of a catalyst composition according to an embodiment of the invention after hydrothermal aging.

The data are summarized in Table 1 below. The last column, labeled Ratio of CO$_2$ After Hydrothermal Aging is the ratio of the concentration of CO$_2$ in the low temperature peak after hydrothermal aging of the sample to the concentration of CO$_2$ in the low temperature peak before aging of the sample. The last column provides a measure of how stable the CDPF is toward hydrothermal aging. A high "Ratio of CO$_2$ After Hydrothermal Aging" is a showing of a CDPF that is stable toward hydrothermal aging.

TABLE 1

Summary of Hydrothermal Aging Data, With and Without AL20

| Curve | Sample Type | Hydro-thermally Aged? | Low Temp. $CO_2$ Peak Temp (°C.) | $CO_2$ (ppm) In Low Temp. Peak | Ratio of $CO_2$ After Hydrothermal Aging |
|---|---|---|---|---|---|
| 6A | Blank | No | 550 | 55 | — |
| 6B | Catalyst Only | No | 340 | 230 | — |
| 6C | Catalyst Only | Yes | 330 | 45 | 20 |
| 6D | AL20 + Catalyst (Two Stage Impregnation) | No | 350 | 230 | — |
| 6E | AL20 + Catalyst (Two Stage Impregnation) | Yes | 380 | 125 | 54 |
| 6F | AL20 + Catalyst (Single Stage Impregnation) | No | 325 | 270 | — |
| 6G | AL20 + Catalyst (Single Stage Impregnation) | Yes | 330 | 140 | 52 |

The temperatures of the low temperature $CO_2$ peak before and after hydrothermal aging were 340° C. and 330° C. for the catalyst alone (curves 6B and 6C), 350° C. and 380° C. for the catalyst and AL20 with the two stage impregnation, and 325° C. and 340° C. for the catalyst and AL20 with a single stage impregnation (curves 6F and 6G). The temperature at which the low temperature $CO_2$ peak occurred therefore did not change significantly with hydrothermal aging of the CDPF.

There were large differences in the $CO_2$ content of the low temperature peak before and after hydrothermal aging, however. The $CO_2$ content of the low temperature peak for the substrate with the catalyst alone (with no aluminum oxide) was 220 ppm before hydrothermal aging and 45 ppm after hydrothermal aging (curves 6B and 6C). The $CO_2$ concentration in the low temperature peak after hydrothermal aging was only 20% of the $CO_2$ concentration for the substrate with the fresh catalyst. The catalyst suffers significant deactivation when exposed to hydrothermal aging.

The $CO_2$ concentrations in the low temperature peak for the substrate with the catalyst and AL20 with the two stage impregnation before and after hydrothermal aging were 230 ppm and 125 ppm, respectively (curves 6D and 6E). The hydrothermally aged sample with the two stage catalyst/AL20 impregnation retained 54% of its fresh activity after hydrothermal aging.

Similarly, the $CO_2$ concentrations in the low temperature peak for the fresh and hydrothermally aged sample with the catalyst and AL20 impregnated in a single stage were 270 ppm and 140 ppm, respectively (curves 6E and 6F). The sample with the catalyst and AL20 impregnated in a single stage retained 52% of its fresh activity after hydrothermal aging, compared to 20% activity retention for the substrate with the catalyst composition that did not comprise aluminum oxide.

The two samples that were impregnated with AL20 and a catalyst composition according to an embodiment of the invention retained 54% and 48% of the activity of the fresh sample after hydrothermal aging, compared to only 20% for the sample with the catalyst without alumina. The samples that comprised colloidal alumina were significantly more stable to hydrothermal aging than the sample with the catalyst composition alone. The AL20 alumina in the washcoat may stabilize the CDPF toward hydrothermal aging. The improved resistance of the CDPF with the addition of alumina is a significant improvement and an advance over conventional CDPF's.

Example 6

Typical Preparation of a Catalyzed Diesel Particulate Filter

The following example is a typical preparation for a catalyzed diesel particulate filter according to an embodiment of the present invention. Although the substrate that was used in Example 6 was larger than the substrates that were used in Examples 1-5, the following preparation is otherwise a typical preparation.

A corderite DPF substrate from Corning with 200 cells per square inch was used in the preparation. The substrate was 5.66" in diameter and 6" long.

A slurry of 500 g of colloidal alumina (Nyacol AL20® was formed. The alumina slurry was placed on the walls of the DPF filter using a vacuum dosing system known to those skilled in the art. After drying at room temperature with an air blower, the wash-coated substrate was calcined in air at 550° C. for 4 hours. The weight of the alumina on the substrate after heat-treatment was 75.5 g, which corresponded to 30.2 g/L of wash-coat loading.

A total of 695.2 g of $Ce(NO_3)_3$ solution (27.5 wt % of $Ce_2O_3$), 83.45 g of $Co(NO_3)_2)\times 6H_2O$, and 101.15 g $Sr(NO_3)_2$ in 150 g $H_2O$ were mixed to form a homogenous solution having a Ce/Co/Sr molar ratio of 60/15/25. A total of 665 of solution were impregnated into the DPF having the alumina wash-coat A total of 566 g of solution was deposited on the DPF. After drying at room temperature with an air-blower, the substrate was calcined at 550° C. for 4 hours. Weight of the cerium, cobalt and strontium components after heat-treatment deposited on the substrate was 64 g, which corresponded to a total catalyst loading of 25.6 g/L. The catalyst does not contain platinum group metals (PGMs).

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A catalyzed diesel particulate filter consisting essentially of:
   a) a substrate for filtering particulates from diesel engine exhaust; and
   b) a catalyst composition, wherein said catalyst composition comprises:
      i) at least one first component selected from the group consisting of cerium, a lanthanide and mixtures thereof; and
      ii) at least one second component selected from the group consisting of copper, manganese and mixtures thereof,
      wherein said first component and said second component are in an oxide form after a calcination; wherein the catalyst composition does not comprise metal sulfates and platinum group metals, and further wherein the catalyst composition does not comprise a perovskite and the second component does not comprise cobalt.

2. The catalyzed diesel particulate filter of claim 1, wherein said substrate is selected from the group consisting of a woven fabric, a wire mesh, a disk filter, a ceramic honeycomb monolith, a ceramic foam, a metallic foam, and a wall flow filter.

3. The catalyzed diesel particulate filter of claim 1, wherein said substrate is made from a material selected from the group consisting of a metal, alumina, silica alumina, cordierite, silicon nitride, silicon carbide, sodium zirconium phosphate, and mullite.

4. The catalyzed diesel particulate filter of claim 1, wherein when said second component comprises manganese, a molar ratio of the first component to the second component is in a range of 15-60:30-70.

5. The catalyzed diesel particulate filter of claim 1, wherein said first component, said second component, and said third component are initially in the form of water-soluble salts.

6. The catalyzed diesel particulate filter of claim 5, wherein said water-soluble salts are dissolved in water to form an aqueous solution, and said aqueous solution is impregnated into said substrate.

7. The catalyzed diesel particulate filter of claim 6, wherein said substrate is calcined after said aqueous solution is impregnated into said substrate, thereby forming said catalyst composition.

8. The catalyzed diesel particulate filter of claim 1, wherein a loading of said catalyst composition on said catalyzed diesel particulate filter is in a range of approximately 5 g/L to approximately 90 g/L, wherein the loading is on the basis of the oxides.

9. A catalyzed diesel particulate filter, consisting essentially of:
   a) a substrate for filtering particulates from diesel engine exhaust, wherein the substrate has a washcoat thereon; and
   b) a catalyst composition, wherein said catalyst composition comprises:
      i) at least one first component selected from the group consisting of cerium, a lanthanide and mixtures thereof; and
      ii) at least one second component selected from the group consisting of copper, manganese and mixtures thereof,
      wherein said first component and said second component are in an oxide form after a calcination; wherein the catalyst composition does not comprise metal sulfates and platinum group metals, and further wherein the catalyst composition does not comprise a perovskite and the second component does not comprise cobalt.

10. The catalyzed diesel particulate filter of claim 9, wherein said catalyst composition is supported on said washcoat.

11. The catalyzed diesel particulate filter of claim 9, wherein said washcoat comprises aluminum oxide.

12. The catalyzed diesel particulate filter of claim 11, wherein said aluminum oxide is applied to said substrate in a form of colloidal alumina.

13. The catalyzed diesel particulate filter of claim 12, wherein said colloidal alumina is prepared with nano particle technology.

14. The catalyzed diesel particulate filter of claim 11, wherein said aluminum oxide is produced from aluminum nitrate.

15. The catalyzed diesel particulate filter of claim 11, wherein said washcoat further comprises at least one oxide selected from the group consisting of silica alumina, a zeolite, silica, cerium oxide, lanthanide oxide, zirconium oxide, and mixtures thereof.

16. The catalyzed diesel particulate filter of claim 9, wherein a loading of said washcoat is in a range of approximately 5 g/L to approximately 100 g/L.

17. A catalyzed diesel particulate filter consisting essentially of:
   a) a substrate for filtering particulates from diesel engine exhaust; and
   b) a catalyst composition, wherein said catalyst composition comprises:
      i) at least one first component selected from the group consisting of cerium, a lanthanide and mixtures thereof; and
      ii) at least one second component selected from the group consisting of copper, manganese and mixtures thereof, and
   c) at least one third component comprising strontium, wherein said first component, said second component, and said third component are in an oxide foam after a calcination;
wherein the catalyst composition does not comprise metal sulfates and platinum group metals, and further wherein the catalyst composition does not comprise a perovskite and the second component does not comprise cobalt.

18. The catalyzed diesel particulate filter of claim 17, wherein when said second component comprises manganese, a molar ratio of the first component to the second component is in a range of 15-60:30-70.

* * * * *